United States Patent
Rennick

(10) Patent No.: US 6,909,376 B2
(45) Date of Patent: Jun. 21, 2005

(54) INTEGRATED VEHICLE LIGHT AND OBJECT PROXIMITY SENSOR ASSEMBLY

(76) Inventor: Mark Rennick, 4966 Day Lily Way, Acworth, GA (US) 30102

( * ) Notice: Subject to any disclaimer, the term of this patent is extended or adjusted under 35 U.S.C. 154(b) by 260 days.

(21) Appl. No.: 10/097,450

(22) Filed: Mar. 14, 2002

(65) Prior Publication Data

US 2003/0174053 A1 Sep. 18, 2003

(51) Int. Cl.$^7$ .............................................. G08B 23/00
(52) U.S. Cl. ................. 340/693.6; 340/435; 340/693.1; 340/436; 340/943; 362/505; 362/507; 362/518; 362/169; 362/549; 362/543; 362/544
(58) Field of Search .............................. 340/693.6, 435, 340/693.1, 436, 943; 362/505, 507, 518, 169, 549, 228, 543, 544

(56) References Cited

U.S. PATENT DOCUMENTS 5,650,765 A * 7/1997 Park ........................... 340/436
6,400,308 B1 * 6/2002 Bell et al. ..................... 342/71
2002/0180595 A1 * 12/2002 Flick ........................... 340/435

* cited by examiner

Primary Examiner—Tai T. Nguyen
(74) Attorney, Agent, or Firm—Flynn, Thiel, Boutell & Tanis, P.C.

(57) ABSTRACT

A light and sensor assembly (22) for use with a land craft, watercraft or aircraft. The assembly includes a shell (28) for mounting to, or that is a part of the body (24) of, the vehicle. Internal to the enclosed space defined by the shell is a socket and bulb assembly (30, 32) for providing light and heat. Also disposed in the shell is a transducer (36) that emits or receives energy as part of a proximity sensing assembly. The transducer is encased in a transducer housing (38). The transducer housing is positioned relatively close to the bulb so that the heat emitted by the bulb warms the transducer housing. This heat fosters the evaporation of water off the exposed face of the transducer housing so as to minimize the extent to which this water can inhibit the utility of the transducer.

15 Claims, 8 Drawing Sheets

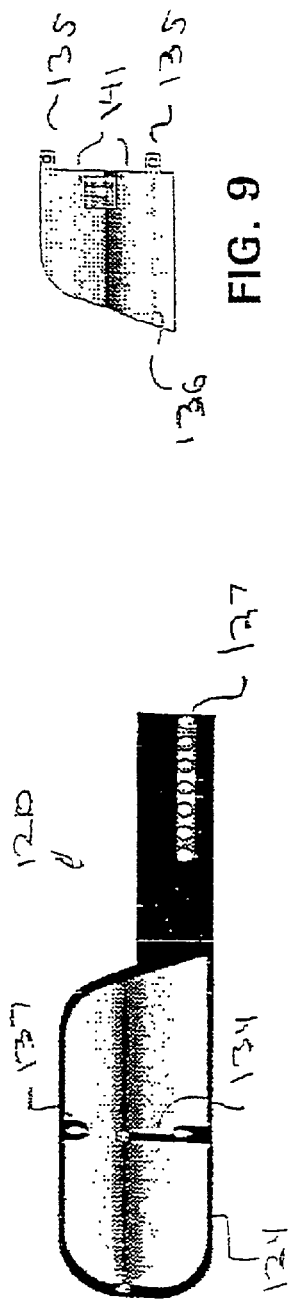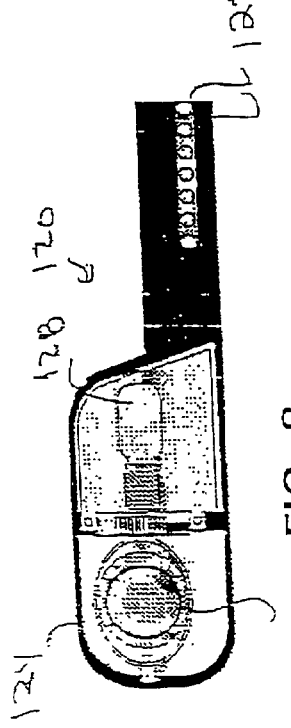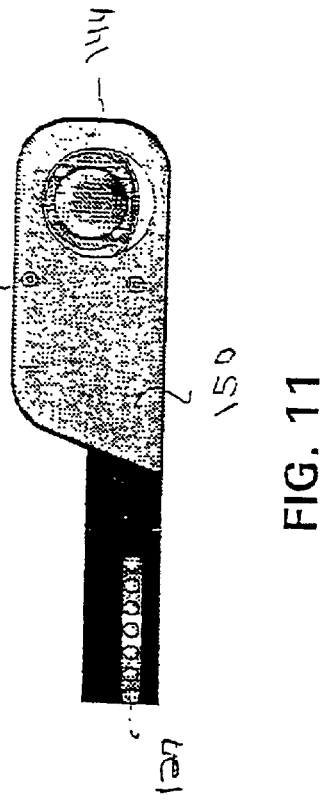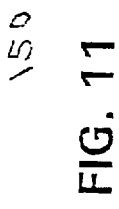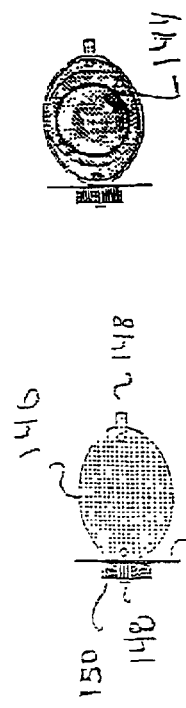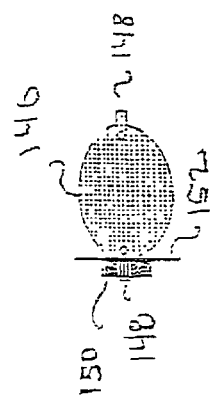
FIG. 7
FIG. 8
FIG. 9
FIG. 10A
FIG. 10B
FIG. 11

US 6,909,376 B2

INTEGRATED VEHICLE LIGHT AND OBJECT PROXIMITY SENSOR ASSEMBLY

FIELD OF THE INVENTION

This invention is directed to a proximity sensor assembly that is installed on a motor vehicle, aircraft or watercraft. More particularly, this invention is directed to an integrated sensor and light assembly.

BACKGROUND OF THE INVENTION

It has become increasingly popular to provide vehicles, especially motor vehicles, with sensor assemblies that provide an indication of when the vehicle is relatively close to another object. Currently, many sensor assemblies include a sonic or ultrasonic transducer. The sensor assembly actuates the transducer so that, for a fixed period of time, the transducer emits a sound wave or an ultrasonic wave. The time period in which this sound/ultrasonic wave travels away from the transducer, is reflected off an object and returns to the transducer is monitored. Based on this time period, a signal processing circuit determines the distance from the transducer to the object. In many proximity sensor assemblies mounted in vehicles, if this distance is relatively close, for example, less than 10 meters in some situations, less than 5 meters in still other situations, and less than 1.5 meters in still other situations, the signal processing circuit then actuates an audibly or visually perceptible alarm. In more sophisticated assemblies, the signal processing circuit generates a visual message that indicates the distance between the vehicle and the object.

Initially, these sensor assemblies were mounted in the rear end of large land vehicles such as trucks and buses in which it was difficult, if not impossible, for the driver to, when looking through a rear view mirror, see objects immediately behind the vehicle. Recently, these sensor assemblies have proved themselves useful in passenger cars, pickup trucks and sport utility vehicles driven by individuals. This is because some of these vehicles are relatively high off the ground. Consequently, even conscientious, careful drivers may not be able to adequately detect the presence of relatively small objects located behind the rear of the vehicle or see a child that carelessly runs behind the vehicle.

Moreover, these assemblies have proven useful because some individuals, while able to drive safely, lack the depth perception to feel comfortable moving their vehicles into confined spaces. Thus, these individuals find the presence of these proximity sensors comforting because they provide a distinct warning when the vehicle is very close to an adjacent object.

Typically, the transducer unit, or units, of these proximity sensing assemblies is mounted to the bumper or a frame element of the vehicle with which it is integral. Sometimes, for a large vehicle, the transducer is mounted to the top of the vehicle and directed diagonally downward. An advantage of this arrangement is that the transducer is out of view and therefore not an attraction to curious fingers. Moreover, sometimes these transducers are mounted so as to be oriented either substantially horizontally or diagonally upwardly. In these configurations, the proximity sensing assembly is configured to detect elevated objects, such as awnings, overhanging walls, canopies, fences or low hanging utility lines that are difficult, if not impossible, for a driver of a large vehicle to observe when they are directly behind the vehicle.

There is, however, a problem associated with currently known transducer assemblies. Owing to the nature of the function performed by these assemblies, they are exposed to the ambient environment. Consequently, rain and snow fall on these assemblies. This precipitation, be it in liquid or solid form, has a tendency to adhere to the head of the transducer through which it transmits and receives signals from the surrounding environment. Problems arise because this water, be it liquid or solid state, has a tendency to absorb and/or diffuse the energy emitted or received by the transducer. If the fraction of energy that is absorbed and/or diffused by this water is significant, the utility of their transducers diminishes and, in some instances, is rendered useless.

One solution that has been suggested to minimize this problem is to provide some sort of heating coil adjacent the transducer. A disadvantage of this arrangement is that it requires providing and mounting to the vehicle an extra component, the heating coil. This requires one to feed relatively wide gauge, large in size, power supply wires to the heating coil. Providing these power conductors adds to the expense of installing these sensors when the vehicle is being built. In the case of an older vehicle, it may be impossible to snake these conductors to the location where the sensor is to be mounted. Moreover, in both old and new vehicles, having to provide an energization current to the heating coil increases the load that is placed on the vehicle's electrical system.

SUMMARY OF THE INVENTION

This invention is related to a new and useful proximity sensor assembly for a vehicle. In particular, the proximity sensor assembly of this invention is an integrated light-and-transducer assembly. The assembly relies on the heat dissipated by a vehicle lamp to warm the transducer and more specifically, the exposed portion of the housing that surrounds the transducer. This heat thus prevents precipitation from freezing over the transducer housing and fosters the evaporation of the precipitation off the housing. This minimizes the likelihood that water from the ambient environment will cover the exposed portion of the transducer housing so as to diminish the utility of the proximity sensor assembly.

BRIEF DESCRIPTION OF THE DRAWINGS

The invention is pointed out with particularity in the claims. The above and further features and benefits of the invention are understood by the following Detailed Description taken in conjunction with the accompanying drawings in which:

FIG. 7 is plan view of another alternative assembly of this invention;

FIG. 8 is a plan view of the shell of FIG. 7;

FIG. 9 is a plan view of the reflector of FIG. 7;

FIGS. 10A and 10B depict the mounting plate of the assembly of FIG. 7, respectively, in plan view and with the transducer housing mounted to it;

FIG. 11 is a plan view of the mirror image of the assembly of FIG. 7 with a lens mounted over the open face of the shell.

DETAILED DESCRIPTION

Figure 1:
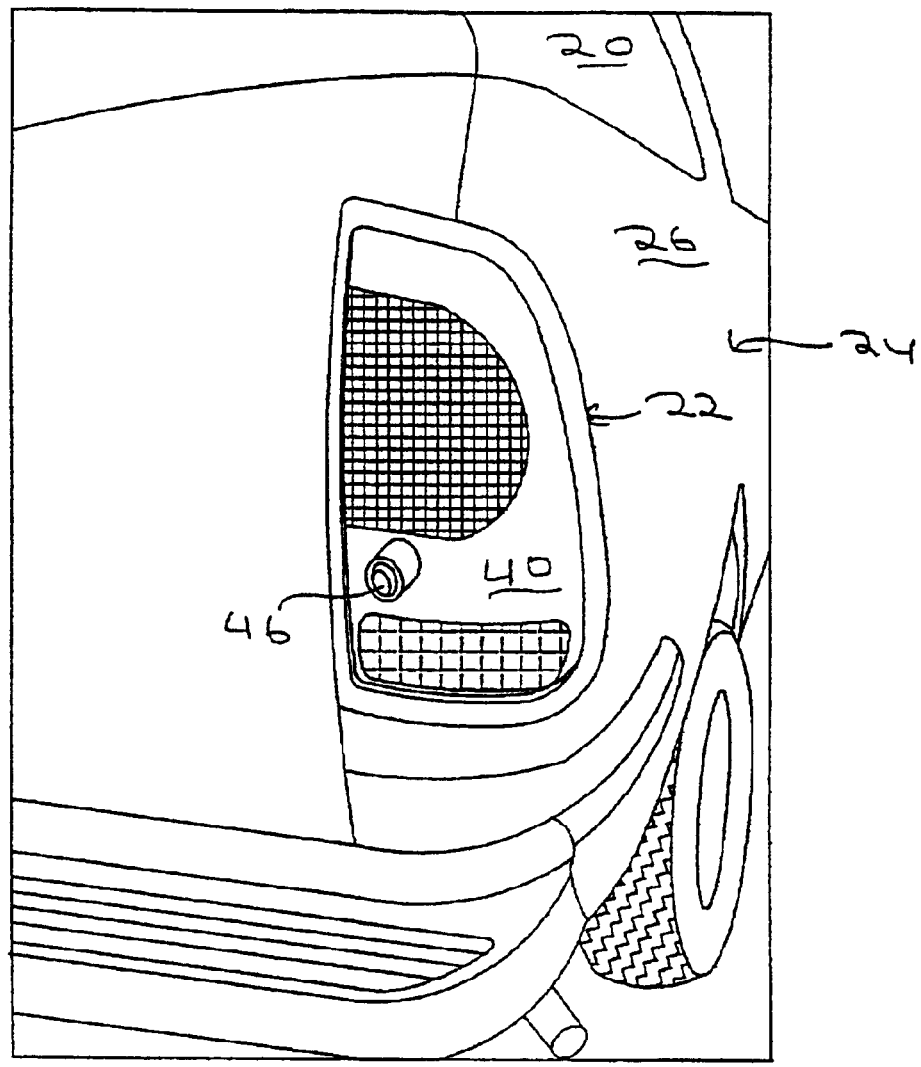
FIG. 1 depicts the rear end of a vehicle with an integrated tail light-and-transducer assembly of this invention.
Figure 2:
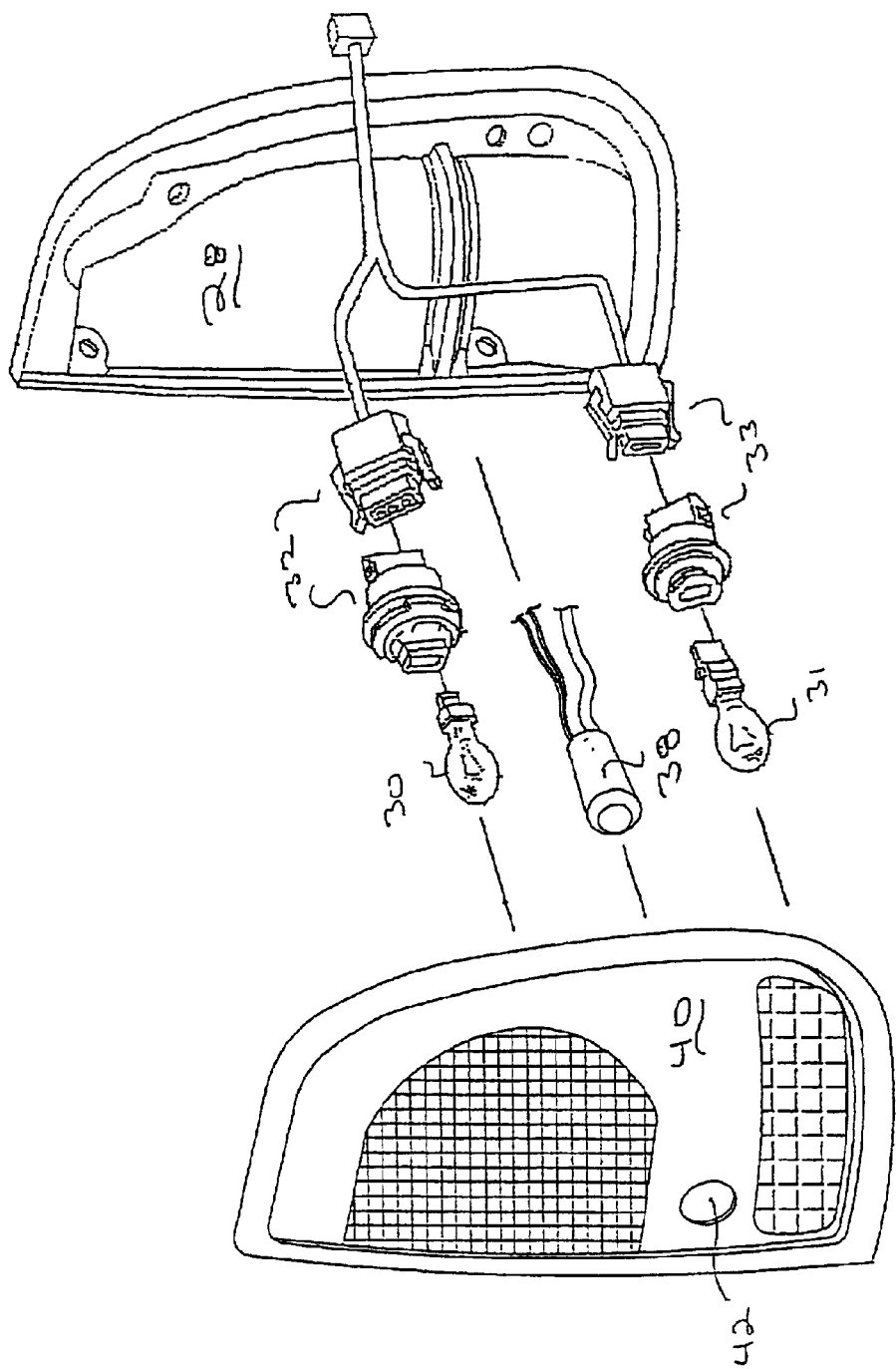
FIG. 2 is an exploded view of the integrated tail light-and-transducer assembly of FIG. 1.

FIGS. 1 and 2 depict a vehicle 20 to which the light and proximity sensor assembly 22 is mounted. The vehicle 20 includes a body 24 a portion of which is, as depicted, a rear fender 26. Mounted in a space defined by a cutout opening in the rear fender 26 is the light and proximity sensor assembly 22. Assembly 22 includes a shell 28, sometimes referred to as a lamp housing, that is secured to the rest of the vehicle 20. Specifically, in some versions of the invention, shell 28 may be a portion of the body 24 that is shaped to hold the parts contained within it. Alternatively, shell 28 may be secured by threaded fasteners or other means to either the vehicle body 24 or a portion of the vehicle's frame (frame not shown). Lamps, incandescent light bulbs 30 and 31 in this version of the invention, are fitted into sockets 32 and 33, respectively, that are mounted in shell 28. Not shown is the structure by which the sockets 32 and 33 are held in the shell 28. Often, but not always, sockets 32 and 33 are seated in openings formed in the shell 28. Since the depicted version of the invention is a rear fender, bulb 30 is the vehicle tail light and bulb 31 is the vehicle turn light. Also disposed in shell 28 is a transducer 36 (FIG. 3) that is part of the proximity sensor assembly. In some versions of this invention, transducer 36 is a piezo-electric element that sequentially emits a sonic or ultrasonic energy beam and then generates an electric signal in response to receipt of a reflected version of the sonic/ultrasonic energy beam. The transducer 36 is seated in a transducer housing 38.

Assembly 22 includes a lens plate 40 that covers shell 28 and bulbs 30 and 31. The lens plate 40 is formed with selectively transparent material so that when the bulbs 30 and 31 are actuated, light of the appropriate color and intensity is emitted from the assembly 22. The lens plate 40 is formed with a hole 42. When the lens plate 40 is fitted over shell 28, the front end of transducer housing 38 is seated in hole 42.

Figure 3:
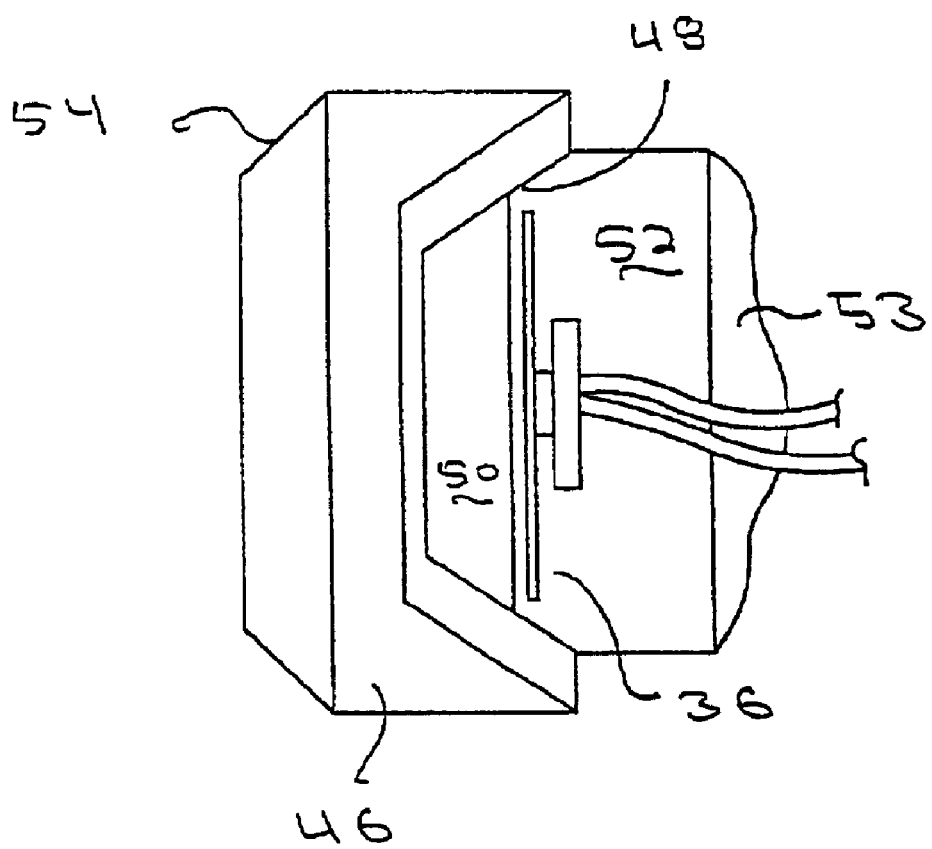
FIG. 3 depicts how a transducer is mounted in a sensor shell.
Figure 4:
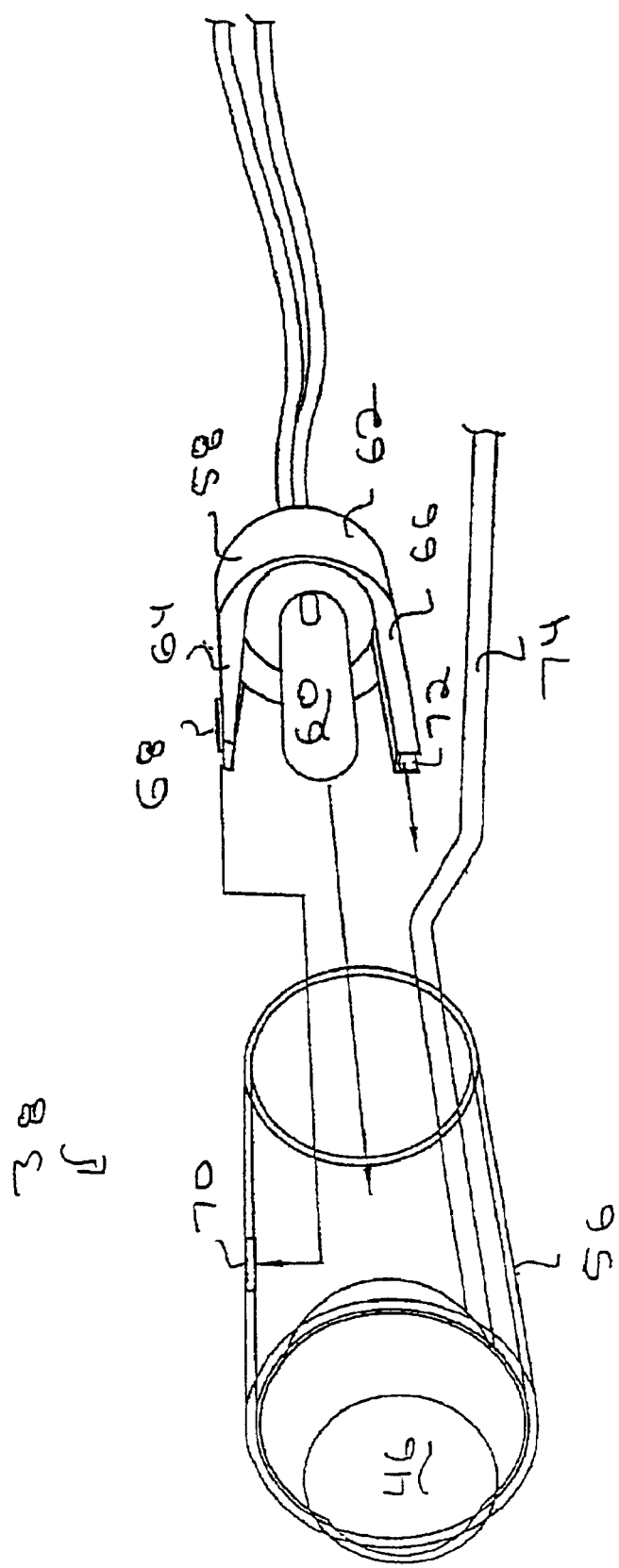
FIG. 4 is an exploded view of the transducer housing of this invention.

As seen in FIGS. 3 and 4, the transducer housing 38 includes a circular shell 46 in which transducer 36 is mounted. Shell 46 is formed of any material that does not significantly absorb the type of energy transmitted and/or received by transducer 36. When the transducer 36 emits and/or receives sonic or ultrasonic energy, shell 46 may be formed out of metal such as aluminum, a ceramic material or an ABS plastic. The shell 46 is formed to have a rear section that defines a recess 48. Transducer 36, which is generally disk shaped, is seated in the recess 48. A small layer of cork 50 is disposed between the outwardly directed face of the transducer and the adjacent surface of the shell against which this face is directed. The cork 50 serves as a shock absorber between the transducer 36 and the shell 46. Layers of silicone 52 and 53, respectively, or other material is employed to cement the transducer 36 in the shell recess 48. In the depicted version of the invention, shell 46 is formed so that the exposed face has a circumferentially extending bevel 54.

Shell 46, with the transducer 36 mounted therein, is disposed within a clear plastic tube 56, also part of transducer housing 38. More specifically, the transducer 36-and-shell 46 subassembly are fitted in tube 56 so as to be located in the end of the shell that extends beyond lens plate 40. Also disposed in shell 46 is a socket 58 and bulb 60 subassembly. Socket 58 has a circular base 62 that is dimensioned to snuggly fit within the end of tube 56 opposite the end in which the transducer 36-and-shell 46 subassembly are fitted. Two diametrically opposed legs 64 and 66 extend from the outer perimeter of the socket base 62 towards the shell 46. Legs 64 and 66 are positioned to abut the inner wall of tube 56. Leg 64 is shaped so as to have a tab 68 that projects outwardly away from the outer surface of the leg. When the socket 58 is fitted in tube 56, tab 68 seats in a hole 70 formed in the tube 56 to hold the socket in the tube.

Leg 66 of socket 58 is formed to define a groove 72 along its outer surface. Groove 70 extends from the distal end of the leg 66, the end closest to shell 46, along the outer perimeter of the portion of the socket base 62 from which leg 66 extends. When the socket 58 is fitted in tube 56, the wires 74 that extend from the transducer 36 are run out of tube 56 through groove 72 (one wire 74 shown). The seating of the wires 74 in groove 72 prevents their contact with bulb 60 and the attendant damage to the insulation of these wires that such contact could cause.

In some versions of the invention, the actuation of bulb 60 is controlled by the sensor processing circuit to which transducer 36 is connected. In these versions of the invention, the sensor processor circuit may be configured to actuate bulb 60 whenever the circuit itself is actuated to perform its object proximity sensing. Thus, in these versions of the invention, the actuation of bulb 60 serves, in part, as an indication that the proximity detection sensing assembly is actuated.

In alternative versions of this invention, the sensor processing circuit may actuate bulb 60 whenever the circuit itself is actuated and an internal diagnostic module determines that the proximity sensing function is being properly performed. For example, in some versions of the invention, the diagnostic module monitors whether or not a reflected signal is received after the transducer emits an interrogation signal. The receipt of the reflected signal is recognized by the diagnostic module as an indication that the proximity sensing assembly is properly functioning. In these versions of the invention, the proximity of an object is evaluated by a signal strength circuit that monitors the strength of the reflected signal, or a timing circuit that monitors when the reflected signal is received.

In still other versions of the invention, bulb 60 may function as a back-up heater and light element. Thus, in these versions of the invention, the energization of bulb 60 is regulated by an actuation circuit that receives as an input a signal from a transducer on the vehicle that generates a signal representative of ambient temperature. When this signal indicates that the ambient temperature is below a certain level, the actuation circuit closes a mechanical or electrical switch to allow an energization current to be applied to the bulb 60. Thus, in these versions of the invention, bulb 60 provides added heat to prevent precipitation from freezing on the exposed portion of the transducer housing.

In still other versions of the invention, the actuation circuit that regulates the on/off state of bulb 60 receives as an input the signal from a moisture detector mounted to the vehicle. This particular detector is mounted to the vehicle body to generate a distinct signal whenever precipitation or condensation covers the vehicle. When the moisture detector generates a signal indicating that the liquid or solid state water is covering the vehicle, the actuation circuit for bulb 60 applies an energization signal to the bulb so as to cause illumination of the bulb. The actuation of bulb 60 also causes the bulb to heat the transducer housing 38 for the purpose discussed below.

In the assembly 22 of this invention, the shell 46 in which the transducer 36 is housed is either located within the space enclosed by shell 28 and lens plate 42 or is in a space contiguous with this space. The heat generated by light bulbs 30 and 31 is transferred to the transducer 36 and the shell 46 in which it is encased primarily by conduction and radiation. This heat warms the exposed face of the shell. The heat present on this surface is, in turn, transferred by conduction to liquid or solid state water on this surface. The transfer of heat to this water fosters the evaporation off the exposed face of the shell. Thus, the heat generated by bulbs 30 and 31 facilitates the dissipation-by-evaporation of water off the exposed face of the transducer housing. The dissipation of this water substantially reduces, if not eliminates, the instances of this water collecting on the exposed face of the transducer housing to such an extent that it appreciably absorbs the energy transducer 36 emits and/or receives. This energy absorption, if allowed to occur, can adversely affect the performance of the proximity sensor assembly with which the transducer is integral.

It should further be recognized that, in the event precipitation ices over the exposed face of the transducer housing, the thermal energy transferred from the lights 30 and 31 to the transducer housing melts this ice. This further fosters the removal of the water from over the transducer housing since the water, when in a liquid state, does have a tendency fall or flow over a moving surface on which it rests.

The assembly 22 of this invention is further designed so that heat employed to foster the removal of water from over the transducer housing comes from existing components, the light bulbs 30 and 31 that provide an indication of vehicle position, movement, or that provide for illumination around the vehicle. Thus, the invention eliminates the need to provide components for the sole purpose of which is to foster removal of accumulated liquid and solid-state water. Moreover, in this invention, the transducer is mounted in a space that is part of a larger space already removed from the vehicle body 24. In other words, the transducer and its heater are not mounted in a new hole that needs to be added to the vehicle body 24 or over the surface of the vehicle body. Thus, the presence of the sensor assembly of this invention does not appreciably detract from the overall aesthetic appearance of the vehicle body 24. Moreover, since the sensor assembly 24 is positioned on the vehicle at a location where there are already electrical connections and there is a cutout for other components, the sensor assembly can be added relatively easily to the vehicle after manufacture.

Figure 5B:
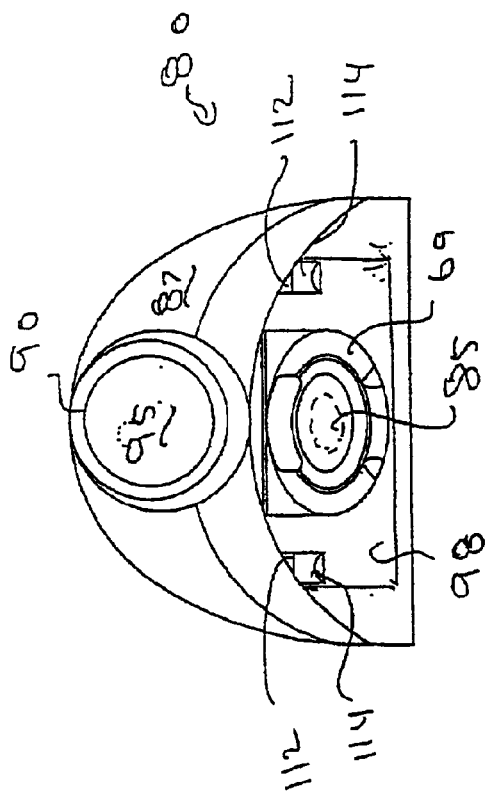
FIGS. 5A and 5B are, respectively, plan and side views of an alternative sensor assembly of this invention.
Figure 5A:
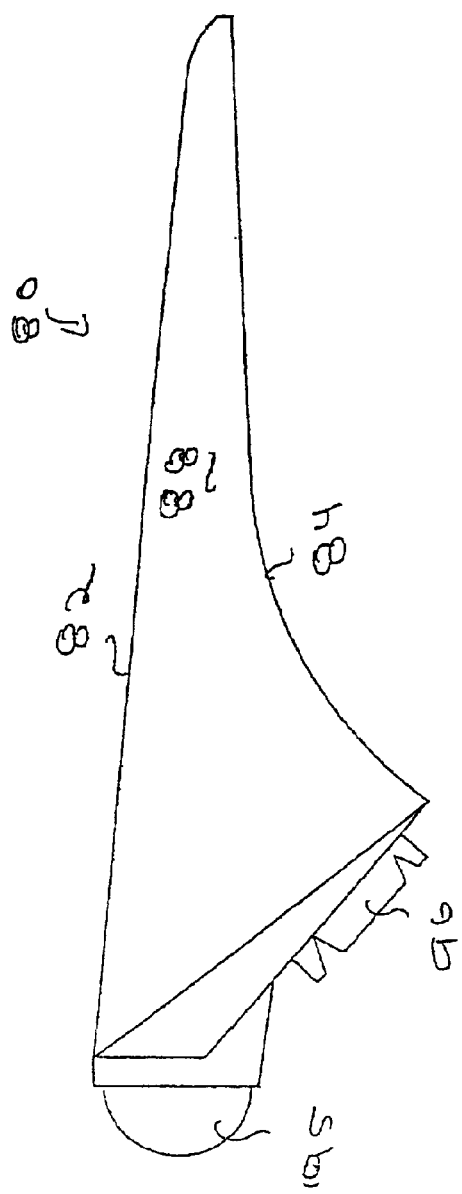
Figure 6:
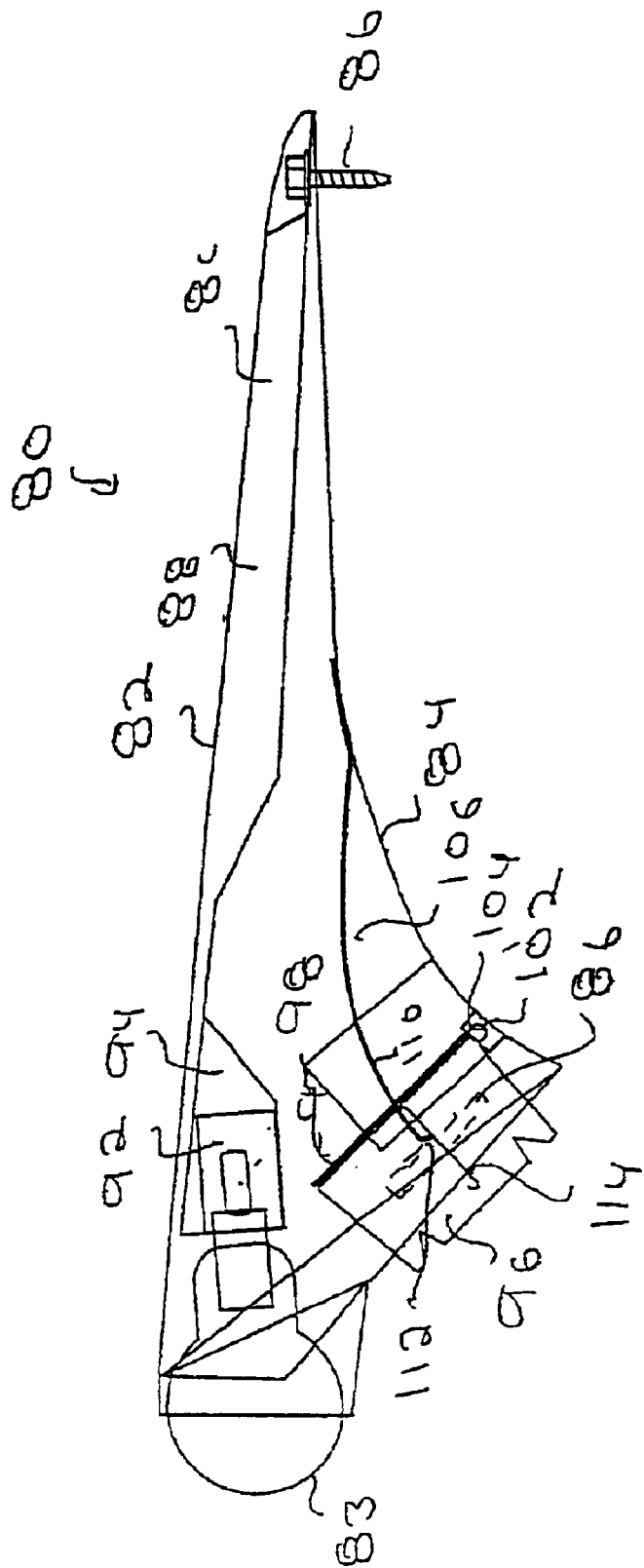
FIG. 6 is a partially cutaway view of the assembly of FIG. 5A.

FIGS. 5A, 5B and 6 illustrate an alternative sensor assembly 80 of this invention. This version of the invention is designed for mounting to the top of a vehicle body component. Thus, this assembly can be mounted to the top rear of a sport utility vehicle, a truck body, a truck cap or a bus. Assembly 80 includes a shell 82 that houses a bulb 83 that provides an indication of vehicle presence and a transducer 85 that is part of a proximity sensor assembly (transducer shown in phantom). Shell 82 has a base 84 that is shaped to conform with the vehicle body surface to which the shell is mounted. Fasteners 86, one shown, extend through holes in the base so as to secure the shell to the associated vehicle, (holes in base not shown). A cap section 88, also part of the shell 82, extends upwardly from and over the base 84 so as to define an enclosed space within the shell. Shell 82 also has an arcuately shaped face plate 87 that extends downwardly from cap section 88. Face plate 87 does not, however, completely encase the open end of the shell. Access to the interior of the shell 82 is gained through the area below the face plate 87. Shell 82 is further shaped to have a cylindrical open ended section 90 that extends through face plate 87. Bulb 83 is seated in section 90.

Bulb 83 is mounted to an electrical socket 92 disposed inside the space within shell 82. More particularly, socket 92 is compression fitted between two parallel tabs 94, one shown, that extend downwardly from cap section 88. Once the bulb is mounted to socket 92, the bulb extends through the open end of shell section 90. A semi-circular transparent lens 95 is threaded, or otherwise removably secured, to the open end of shell section 90 to provide a protective cover over bulb 83.

Transducer 85 is disposed within a housing 96. Housing 96, or at least the portion of the housing 96 that covers transducer 85, is, like shell 46, formed of material that does not significantly absorb the type of energy emitted and/or received by the transducer. The housing 96 is secured to a plate 98. The lower end of plate 98 is provided with a curved or hooked section 102 that is fitted around a post 104 internal to and integral with shell 82. In some versions of the invention, post 104 is integrally molded with cap section 88. In alternative versions of the invention, post 104 is a separate component that is welded, glued and/or snap-fitted in shell 82 so as to extend between the opposed interior walls of cap section 88.

Plate 98 is pivotally attached to post 104 so the inclination of the transducer 85 can be selectively set after assembly 80 is mounted to the vehicle 20 with which the assembly is used. A spring plate 106 mounted to shell base 84 holds the plate 98, and therefore, transducer 85, in its set position. The spring plate 106 is formed from a relatively flexible piece of metal. The spring plate 106 has a base 108 that is secured to shell base 84. Two spaced legs 110 extend from the base 108 toward the open end of the shell 82. Each leg 110 has a downwardly directed foot 112 that bears against a separate tab 114 that is part of plate 98. The tabs 114, which are integral with plate 98, are formed from flexible metal and extend perpendicularly to the main surface of the plate 98.

While not shown, it should be recognized that the conductors which supply energization signals to bulb 83 and drive signals to, or receive signals from, transducer 85 are fed into the shell through an opening in the base 84.

Assembly 80 is designed for mounting to an upper rear corner surface of the vehicle with which it is used. Once the assembly is so mounted, the orientation of the transducer 85 is set by urging tabs 114 downward or forcing the spring legs 110 upwardly. The spacing of the spring legs 112 from the tabs 114 allows the transducer 85 to be pivoted so that its orientation can be set. Once the transducer 85 is properly oriented, the spring feet 112 are again allowed to bear against tabs 114. The force of the spring serves to hold the plate 98, and therefore transducer 85, in the selected position. Once the transducer is properly positioned, a cover plate is fitted over the open end of shell 82 (cover plate not shown). This cover plate may have an opening through which the transducer housing 96 partially extends.

Assembly 80 is thus constructed so that the heat emitted by bulb 83 warms transducer housing 96. The heating of the transducer housing 96 substantially eliminates the likelihood that ice will stay adhered to this housing and significantly absorb the energy transducer 85 is designed to emit and/or receive. The heating of the transducer housing 96 also fosters the evaporation of liquid state water off the exposed face of the housing. This water, if allowed to accumulate, can likewise adversely affect the overall performance of the proximity sensing assembly.

FIGS. 7 and 8 illustrate another alternative assembly 120 of this invention. Assembly 120 includes an elongated base 122 designed for mounting to a portion of the vehicle body. The opposed ends of the base 122 are shaped to define open faced shells 124. Between the shells 124, base 122 is in the form of an elongated member 126. A set of LEDs 127 is mounted in elongated member 126. LEDs 127 can collectively function as a center-located brake light A light bulb 128 and transducer 130 are mounted in each shell 124. More particularly, the material forming the base 122 is shaped so that a wall 134 partially bisects the space within each shell 124. A curved reflector 136, FIG. 9, is mounted in the space on one side of the wall 128. The reflector 136 is formed with tabs 135. A first tab extends over wall 134. A second tab 135 extends over a small finger formed integrally with base 122 opposite the end of wall 134. Fasteners (not shown) extend through the tabs 135 to hold the reflector 136 in the shell 124. A socket 140, to which the bulb 128 is mounted, is snap secured to the reflector by clips 141 mounted to the reflector 136. Bulb 128 is thus positioned to be located over reflector 136.

The transducer 85 is mounted in a transducer housing 144 that is disposed in the space on the side of wall 134 opposite the side to which socket 140 is mounted. Transducer housing 144 is mounted to a plate 146 seen in FIGS. 10 and 10A. Plate 146 has a generally oval shape. Posts 148 extend away from opposed ends of plate 146. A gear 150 is fixedly secured over one of the posts 148. A fastening plate 152 is located between the portion of plate 146 and gear 150. The post that extends through the fastening plate 152 is free to rotate relative to the fastening plate. When the transducer is mounted in the space within its associated shell 124, the post 146 that does not have a gear over it is seated in an opening in the wall of the base opposite wall 128. The opposed end of the plate 146, the end to which the gear 150 is attached, is positioned so that the gear is located in the opening defined by the end of wall 128. Fastening plate 152 is thus located against the side of wall 128 and secured to wall 128. Owing to this assembly, plate 146, and thus the transducer 85, is able to rotate within shell 124. A leaf spring mounted to wall 128 engages the teeth of gear 150 (leaf spring not shown). The leaf spring thus prohibits unintended rotation of plate 146.

Assembly 120 is constructed so that after the assembly is mounted to the vehicle with which the assembly is used, the transducer can be rotated within the shell so as to have the selected orientation. Once the transducer is so positioned, a transparent lens 150, FIG. 11, is fitted over the shell 124. Lens 150 is formed with an opening 152 through which the transducer housing extends. Once the lens 150 is so secured, the space within shell 124 is, nevertheless, substantially enclosed. Thus, when bulb 128 is actuated, the thermal energy emitted by the bulb warms the air within the shell. Thus, the thermal energy emitted by the bulb is transferred to the transducer housing to substantially eliminate the possibility that precipitation will freeze over the housing or stay frozen to the housing once the bulb is actuated. This heating also fosters the evaporation of liquid-state water off the transducer housing. This water, it should be understood, can originate as rain, melted snow, collected fog droplets or dew.

Some versions of assembly 120 of this invention are thus provided with two transducers. In these versions of the invention, when an individual transducer both emits a beam of energy and detects the fraction of the beam that is reflected, the transducers are positioned to have different orientations. Thus, one transducer is positioned to detect objects low to the ground; the second transducer is positioned to detect suspended objects which are difficult for the vehicle operator to see that could be potential hazards.

Figure 12:
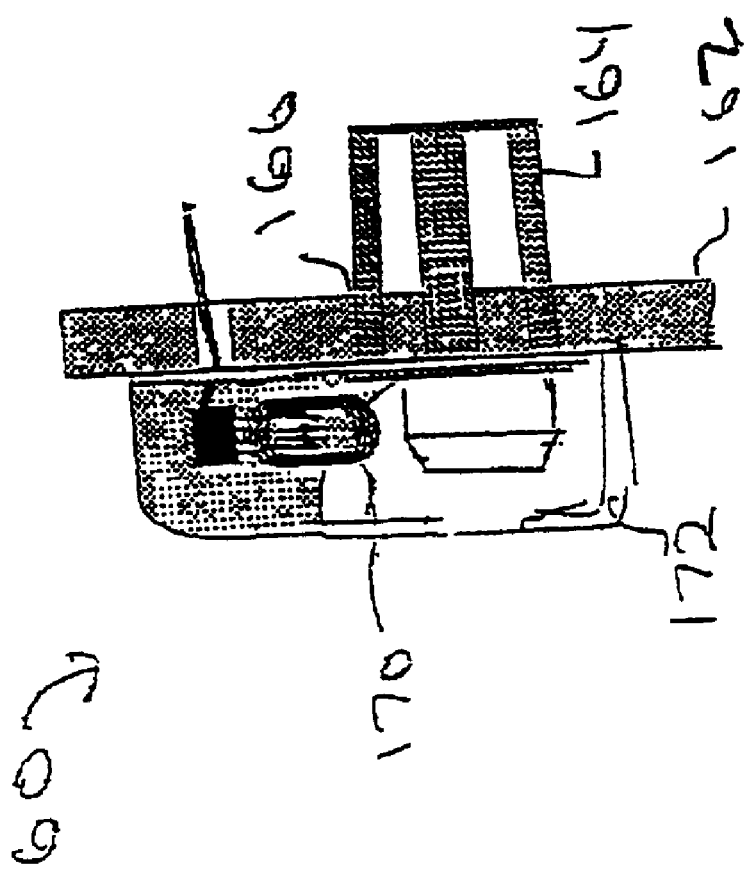
FIG. 12 is a side view of another alternative assembly of this invention.

An assembly 160 of this invention, now described by reference to FIG. 12, is designed to be mounted to the bumper 162 of a vehicle. Assembly 160 includes a socket 164 fitted in a hole 166 that extends through the vehicle. The previously described transducer 36, fitted in transducer housing 38, is fitted in the socket. Mounted to the bumper 162 immediately above the socket 164 is a bulb socket 168. A halogen bulb 170 extends downwardly from the bulb socket and is directed to the portion of the transducer housing that extends forward from the exposed face of the bumper 162. A transparent housing 172 extends over bulb socket 168, bulb 170, and surrounds the exposed face of the transducer housing. Housing 172 thus protects the bulb and defines a space around the bulb and the transducer housing 38 in which there is minimal air circulation. Consequently, heat emitted by the bulb is transferred by conduction through this surrounding air and transferred to the transducer housing 38. This version of the invention may be installed on the bumper 162 at a position so that the bulb 170 serves to illuminate the license plate attached to the bumper.

It should be recognized that the foregoing are descriptions of some versions of the light and proximity sensor assembly of this invention and that other versions of the invention may have features that are different from what has been described. For example, only one specific type of sensor has been described. Other versions of the invention may have transducers different from what has been described. Thus, it is possible that other versions of this invention will have sensors designed to emit and/or receive microwave energy, RF energy, infrared light energy, or coherent, (laser) light energy. For example, some transducers may be gas sonar devices. Also, there is no requirement that each transducer of all versions of this invention both emit and receive the integrating and returned energy used to detect the proximity of nearby objects. Thus, in some versions of this invention, there may be a first transducer that emits the interrogating beam of energy. In these versions of the invention, one or more second transducers are provided that receive the reflected energy. For example, in these versions of the invention, the plural receivers may be used to collectively provide an indication of not only the presence of an object in the vicinity of the vehicle but also an indication of its distance and or direction relative to the vehicle.

Some embodiments include a locking member that extends from a shell to a transducer housing. The locking member can be configured to releasably engage the transducer housing to hold the transducer housing in a fixed position relative to the shell.

Similarly, the exposed face of the transducer housings may have a shape different from the illustrated beveled geometry. In some versions of the invention, the exposed face may be completely planar. In alternative versions of the invention, the longitudinally cross sectional profile of this member may be concave, convex, pointed or elliptical. The exact profile of this component can vary as may be necessary to diffuse or focus the beam of energy the transducer is designed to emit and/or receive. It should likewise be understood that, in alternative versions of the invention the transducer housing may not have a circular cross sectional profile. In some versions of the invention, the profile of this component may even be in the form of a polygon. The exact shape of this component may be dictated by such factors as the shape of the transducer, the type of energy emitted and/or received by the transducer and/or aesthetics.

It should likewise be recognized that material disposed in the housing to serve as a shock absorber around the transducer may be different from the described cork. In alternative versions of the invention, natural or synthetic rubber, silicone, polyurethane, Styrofoam or other materials that have the appropriate vibration damping qualities and that do not appreciably absorb the type of energy the associated transducer is designed to emit and/or receive, may be employed as a shock absorber around the transducer. Similarly, where appropriate, this shock absorbing component may not be positioned so that the energy emitted and/or absorbed by the transducer does not pass through the shock absorbing member. Thus, the shock absorbing member could be a ring that extends around the perimeter of the transducer. This ring supports the transducer when the transducer is seated in the associated housing.

Similarly, it should be understood that while in the disclosed version of the invention conventional incandescent bulbs provide both illumination and heat, in other versions of the invention other light emitting devices, lamps, might be provided. For example, in some versions of the invention festoon or halogen bulbs may be provided. In still other versions of the invention, the light source disposed in the shell may be the end of a fiber optic cable that serves as an optical conduit for light generated elsewhere in the vehicle. Furthermore, in some versions of the invention, one or more light emitting diodes may function as the lamp that, in addition to being a source of light, generates the thermal energy that is applied to the transducer housing. In these versions of the invention, as well as other versions of the invention, there may not be lens that covers the light emitting members and/or that partially encloses the component in which the transducer is housed. For example, in a version of the invention that includes an array of LEDs, the transducer and, more particularly, the exposed surface of the housing containing the transducer, is located within the center of this array.

Moreover, while in most versions of the invention the assembly is configured so that the lamp is 40 cm or less away from the complementary transducer housing, in more preferred versions, 25 cm or less, and in most preferred versions 10 cm or less. It should be recognized that, in other versions of the invention, the separation between these components might even be greater. This would especially be true if the light emits a relatively large amount of heat. Alternatively, in some versions of the invention, the transducer housing may abut the outer surface of the lamp.

In some versions of the invention, the transducer may even be integrated into a single removable assembly that also includes the associated lamp. For example, the above described version consisting of an array of LEDs with a center-located transducer may be fabricated as a single unit. This unit is designed to be removably fitted in a socket that is part of the vehicle 20 in which the rest of the proximity sensing assembly is installed. This unit would first have a set of exposed conductors, typically pins, designed to engage socket contacts over which the energization signals are applied to the LEDs. The unit also has a second set of exposed conductors over which signals are exchanged between the proximity sensing transducer and the rest of the proximity sensing assembly. Alternatively, with bulb type lamps, the transducer may be seated in a housing that is secured directly to the outer wall of the bulb forming the lamp.

Similarly, it should be recognized that solid members formed of material that has good thermal conductivity may be provided to transfer heat generated from the lamp directly to the transducer housing. For example, it may be desirable to provide strips or bars of copper or other heat-conducting material that has a first end that abuts an outer surface of the heat generating lamp and a second end that abuts a surface of the transducer housing. These strips or bars serve to facilitate the transfer of heat from the lamp to the exposed face of the transducer housing. For example, in one embodiment of the above-described versions of the invention in which the transducer is centered within an array of LEDs, the LEDs are arranged in a circular pattern. Individual bars of thermally conductive material project inwardly from each LED. Each bar abuts the outer surface of the transducer housing.

Also, it should be recognized that the disclosed geometries of the disclosed assemblies should be understood to be exemplary and not limited. Clearly, the shells and lens that form the enclosures of this invention may have other shapes as dictated by the purposes for which the light emitted by the assemblies is emitted or the aesthetics of their locations. Likewise, there is no requirement that, in all versions of the invention, the light be emitted for the purpose of providing notice of vehicle presence or direction of movement. If it is desirable to provide a proximity sensor in the front of a vehicle, then this assembly can include a headlight that is provided to illuminate the ground and surrounding space in front of the vehicle. Also, there may be situations in which the lamps of this assembly are employed to illuminate a portion of the vehicle, such as the surface against which a license plate is mounted.

It should likewise be understood that the incorporation of bulb 60 and the actuation circuit that regulates the illumination of the bulb is optional and may not always be provided.

Also, while the vehicle with which the described assembly is used is a land type motor vehicle, the use of this invention is not limited to this type of "vehicle." Alternative versions of this invention may be designed for use with bicycles, watercraft and aircraft. Thus, for the purposes of this invention, the term "vehicle" should be understood to mean all possible motorized and non-motorized moving crafts to which this assembly may be attached.

Thus, it is the object of the appended claims to cover all such variations and modifications that come within the true spirit and scope of this invention.

What is claimed is:

1. A vehicle light and sensor assembly, said assembly comprising:
    a transducer for emitting energy or receiving energy as part of a sensing assembly,
    a transducer housing in which said transducer is disposed, said transducer housing adapted for mounting to a portion of a vehicle, said transducer housing having an exposed face through which the energy emitted or received by said transducer is transferred between said transducer and an ambient environment;
    a socket adapted for mounting to a portion of the vehicle adjacent said transducer assembly; and
    a light mounted to said socket, said light configured to emit light energy and heat and wherein said socket is mounted to the vehicle in sufficient proximity to said transducer housing that the heat emitted by said light is transferred to the exposed face of said transducer housing.

2. The vehicle light and sensor assembly of claim 1, further including a shell mounted to a portion of the vehicle, said shell defining an enclosed space and wherein said socket is disposed in the enclosed space and said transducer housing and said light are at least partially contained in the enclosed space.

3. The vehicle light and sensor assembly of claim 2, further including a lens that is secured to said shell so as to cover at least a portion of the enclosed space, and said socket and said light are positioned in the enclosed space so that said light is covered by said lens.

4. The vehicle light and sensor assembly of claim 2, further including a lens that is secured to said shell so as to cover at least a portion of the enclosed space and said socket and said light are positioned in the enclosed space so that said light is covered by said lens and said lens is formed with a lens opening and said transducer housing is mounted in said shell so that said transducer housing extends through the lens opening.

5. The vehicle light and sensor assembly of claim 2, wherein said transducer housing is movably secured in said shell.

6. The vehicle light and sensor assembly of claim 1, wherein said transducer is configured to emit or receive one from the group consisting of: sonic energy; ultrasonic energy; light energy; microwave energy; or RF energy.

7. The vehicle light and sensor assembly of claim 1, wherein said socket is positioned so that said light is within 40 cm or less of said transducer housing.

8. A vehicle light and sensor assembly, said assembly comprising:
a shell, said shell configured for mounting to a body of a vehicle or being a portion of the body of a vehicle, said shell defining an enclosed space;
a first socket mounted within the enclosed space of said shell;
a first light bulb mounted to said first socket, said light bulb configured to emit light and heat;
a transducer unit, said transducer unit including a transducer configured to emit energy to or receive energy from an ambient environment around the vehicle and a transducer housing at least partially disposed in the enclosed space wherein said transducer is disposed within said transducer housing and said transducer housing has an exposed face directed to the ambient environment through which said transducer emits or receives energy and said transducer housing is positioned in the enclosed space so that heat emitted by said first bulb is transferred to said transducer housing; and
a lens disposed over said shell, said lens covering said bulb.

9. The light and sensor assembly of claim 8, wherein said lens is formed with an opening and said transducer housing at least partially extends through said opening.

10. The light and sensor assembly of claim 8, wherein said shell is separate from the vehicle body; said shell is shaped so as to abut a surface of the vehicle; and a fastener is provided for securing the shell to the vehicle.

11. The light and sensor assembly of claim 8, wherein said transducer housing includes a transducer shell element, said transducer shell element defining the exposed face of said transducer housing and having a recess in which said transducer is mounted.

12. The light and sensor assembly of claim 8, wherein said transducer unit includes: a transducer shell element, said shell element defining the exposed face of the transducer housing and having a recess in which said transducer is mounted; a transparent tube wherein said shell element is mounted in a first end of said tube; a second socket disposed in a second end of said tube and a second light bulb mounted to said second socket and disposed in said tube.

13. The light and sensor assembly of claim 8, wherein said transducer housing is movably secured in said shell.

14. The light and sensor assembly of claim 8, wherein said transducer is configured to emit or receive one from the group consisting of: sonic energy; ultrasonic energy; light energy; microwave energy; or RF energy.

15. The vehicle light and sensor assembly of claim 8, wherein said first socket is positioned so that said first bulb is within 40 cm or less of said transducer housing.

* * * * *